Oct. 20, 1953 — A. G. BOYCE — 2,655,757
ARTIFICIAL LURE
Filed Nov. 15, 1948 — 2 Sheets-Sheet 1
Fig. 1.
Fig. 2.
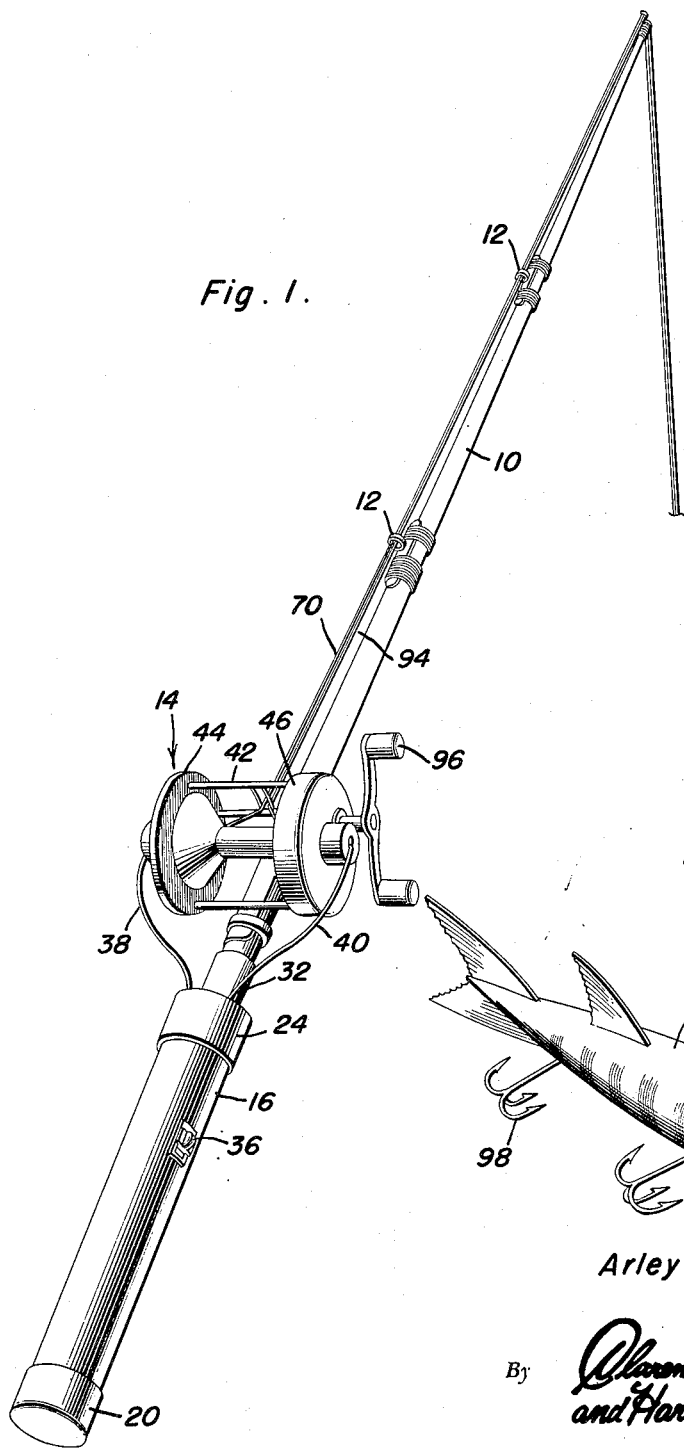
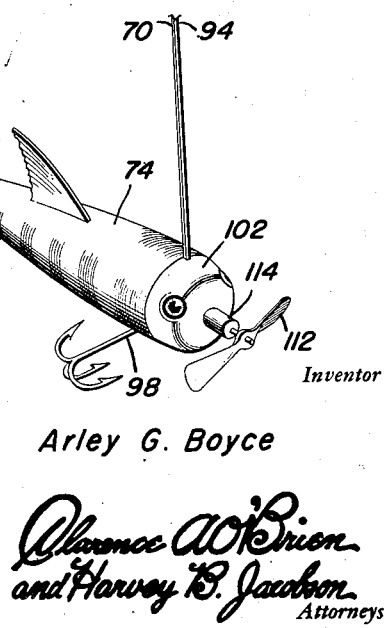
Inventor
Arley G. Boyce
By Clarence A. O'Brien
and Harvey B. Jacobson
Attorneys Oct. 20, 1953 A. G. BOYCE 2,655,757
ARTIFICIAL LURE
Filed Nov. 15, 1948 2 Sheets-Sheet 2

Inventor

Arley G. Boyce

By *Clarence A. O'Brien and Harvey B. Jacobson*
Attorneys

Patented Oct. 20, 1953

2,655,757

UNITED STATES PATENT OFFICE 2,655,757

ARTIFICIAL LURE

Arley G. Boyce, Salem, Oreg.

Application November 15, 1948, Serial No. 60,092

2 Claims. (Cl. 43—26.2)

This invention relates to an artificial lure the primary object of which is to obviate the necessity for either casting or trolling to give motion to the artificial lure.

Yet another object of this invention is to provide an artificial lure with a life-like motion provided within the lure itself.

A further object of this invention is to provide an artificial lure which can be placed and cast in any desired depth of the water and which can be kept moving within a relatively small radius, a movement which is not possible with the casting or trolling methods of fishing.

A still further object of this invention is to provide a lure which can be used to advantage in the fish house commonly used on frozen lakes in the winter. In this type fishing, a light-proof house is placed over a hole in the ice, and the fisherman sits beside the hole with a spear in his hand. Any fish that come within sight are speared at. The method up until now of luring the fish within spearing range has been through the use of a "decoy" which is given motion by the manual manipulation of a short stick, at the end of which the string which is attached to the lure is tied. The stick is moved up and down, causing the decoy to glide through the water. The lure of the instant invention obviates this monotonous chore because it is powered by a small motor enclosed within it and needs no human manipulation to keep it continuously moving. Consequently, an important object of the instant invention is to provide a lure for either catching fish in the summer or luring them within spearing range in the winter method of fishing.

These, together with various ancillary objects and features of the invention which will later become apparent as the following description proceeds, are attained by the device, a preferred embodiment of which has been illustrated by way of example only in the accompanying drawings, wherein:

Figure 1 is a perspective view of the rod and reel employed in the instant invention;

Figure 2 is a perspective view of the lure of the instant invention;

Specific reference is now made to the drawings. In the several views in the accompanying drawings and in the following specification reference characters indicate corresponding elements throughout.

Figure 3:
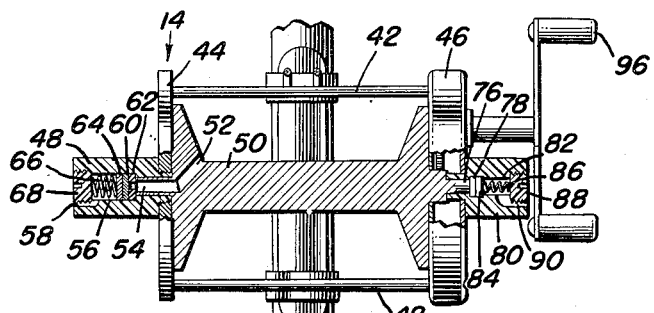
Figure 3 is a longitudinal sectional view through the rod and reel.
Figure 3:
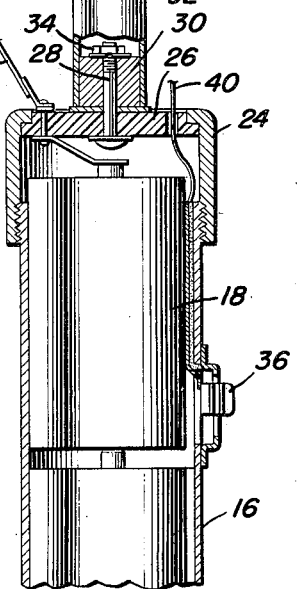
Figure 3:
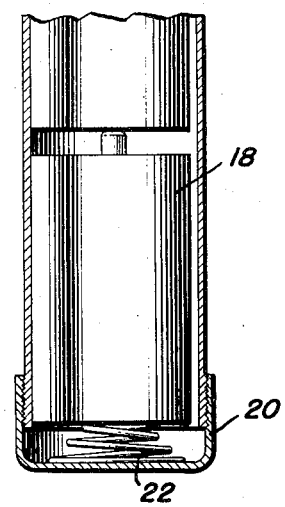
Figure 5:
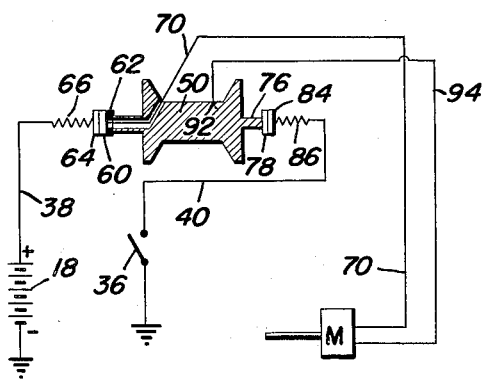
Figure 5 is a diagrammatic view of the electrical circuit employed in the instant invention.

Indicated at 10 is a conventional fishing rod which is provided with the usual line retaining eyelets 12 and a reel 14.

Instead of the usual handle for the rod, a source of electrical energy is substituted therefor which will now be described in detail. A cylindrical casing 16 carrying a plurality of batteries 18 is provided with a bottom closure cap 20 and the conventional spring 22 abutting the bottom edge of the lowermost battery. As will be seen clearly from the drawings the top and bottom edges of the casing 16 are screw threaded and engaging the threads at the top of the casing is a preferably plastic cap 24 having a closure plate 26. Extending through a central aperture in the closure plate 26 is a headed bolt 28 which also extends through a block 30 secured in a collar 32 engaging the bottom end of the rod 10. The bolt 28 is retained on the block 30 by means of the conventional nut and washer as shown at 34. The casing 16 is additionally provided with a conventional switch button 36. The closure plate 26 is further provided with a pair of apertures through which extend a pair of wires 38 and 40, insulated from each other, which are respectively soldered to the positive and negative terminals of the cylindrical casing.

As will be seen clearly from the drawings these conductive wires 38 and 40 eventually lead to the motor in the lure body but to make sure that the wires pass through the reel without the interference with the operation of the reel and at the same time without breaking the electrical connection to the batteries, the following means is provided.

As will be seen clearly from Figure 3, the reel is provided with the usual transversely extending rods 42 terminally secured to a side plate 44 and a further enlarged side plate 46. The side plate 44 has a central aperture about which is secured a preferably plastic plug 48. A metallic spool 50 is provided at one end with an angulated passage 52 communicative with a central bore 54 in the plug 48. The bore 54 is communicated with an enlarged recess 56 which is further provided with a longitudinally extending groove 58. Fixed within the recess 56 is a metallic contact 60, preferably of copper, backed up by an insulating washer 62. Adjacent the metallic contact 60 is a further contact 64 and positioned within the recess 56 is a spring 66 interposed between the contact 64 and the inner surface of a screw threaded closure plug 68. The conductive wire 38 passes through the groove 58 and is secured as by soldering either to the contact 64 or to the spring 66. It will be understood that the spring normally urges the contact 64 into engagement with the contact 60 to complete the circuit thereabout. Secured to the first contact 60 is a further conductive insulated wire 70 which passes through the bore 54 and the passage 52 and thence between the rods 42. The conductive wire 70 is retained on the rod 10 by means of the eyelets 12 and eventually leads to one of the terminals on the motor 72 in the lure 74.

The other side plate 46 of the reel is also provided with a central aperture through which extends a metallic, preferably copper extension 76 carrying a metallic contact 78 at the free end thereof. About the central aperture of the side plate 46 is secured a plug 80, preferably of Plexiglas which is provided with a central bore 82 in which is positioned a brush contact 84, preferably graphitic, and a spring 86 is positioned within the bore 82, seated between the graphite brush 84 and a screw threaded closure plug 88. A groove 90 is provided in the plug 80 through which extends the conductive wire 40 which is connected, as by soldering, either to the spring 86 or directly to the graphitic contact 84. Thus it will be seen that the spring 86 normally urges the graphitic contact 84 into engagement with the copper or metallic contact 78. Connected as by soldering to the metallic spool 50 as at 92 is a further conductive wire 94 which leads to the other terminal of the motor 72. The conventional reel handle is shown at 96.

Figure 4:
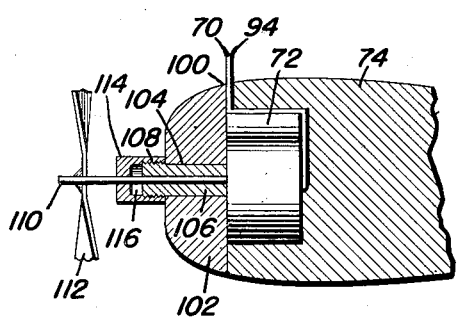
Figure 4 is a fragmentary longitudinal sectional view through the lure.

It will be noted from Figure 2 that the lure 74 is formed preferably of wood and shaped to simulate a fish and that its bottom surface is provided with the usual suspended fish hooks 98. As shown clearly in Figure 4 the lure body 74 is provided with a recess in which the motor 72 fits and an aperture 100 through which the two conductive wires 78 and 94 extend to be secured to the terminals of the motor 72. A nose piece 102 is secured, as by gluing to the lure body 74 and is provided with a central bore 104 through which extends a packing gland 106 which is screw threaded at its free end as at 108. A propeller shaft 110 carrying a propeller 112 at its free end extends through the packing gland and is operatively connected to the motor 72 to be driven thereby. A water sealing plug 114, which is generally cup-shaped, is screw threaded to engage the screw threads 108 of the packing gland 106. The plug 114 is positioned on the packing gland 106 in such a manner that the recess 116 is provided for receiving a water sealing grease.

Thus it will be seen that when the fisherman depresses the switch 36 on the battery casing 16 the motor 72 will be energized to drive the propeller 112 to propel the lure 74 through the water. The special manner in which the conductive wires 38, 40, 70 and 94 are attached to the reel 14 makes it possible for the reel to be wound without breaking the electrical contact between the batteries 18 and the motor 72.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a fishing apparatus including a fishing rod having batteries carried in the handle thereof, a reel having a pair of side walls and a spool carried by said fishing rod, electrical conductors carried by said reel, and an electrically controlled lure connected to said conductors and means connecting said conductors to said batteries, the improvement residing in an insulated housing secured to one side wall of said reel, a passage through the spool and said one side wall communicative with the interior of said housing, a first metallic contact in said housing, a first insulated conductive wire extending through said passage and terminally secured to said first contact and adapted to be connected to a lure, a second contact in said housing, adjustable resilient means in said housing urging said contacts into engagement, a second conductive wire terminally connected to said second contact and adapted to be connected to a battery terminal, a second insulated housing secured to the opposing side wall of the reel, said spool having a lateral portion extending into said second housing and constituting a third contact, a fourth contact in said second housing, adjustable resilient means urging said fourth contact into engagement with said third contact, a third conductive wire terminally secured to said spool and adapted to be connected to a lure, a fourth conductive wire secured at one end to said fourth contact and switch means for connecting said fourth conductive wire to a battery.

2. In a fishing apparatus including a fishing rod, batteries carried by the handle of said fishing rod, a reel carried by said fishing rod, electrical conductors carried by said reel, an electrically controlled lure connected to said conductors, and means connecting said conductors to said batteries; the improvement residing in said reel which comprises a pair of spaced side plates, rods extending between and secured to said side plates, said side plates having aligned bores therein, first and second non-metallic housings attached to said side plates and each housing having a reduced portion received in said bores, a conductor receiving spool mounted between said plates and having shaft extensions rotatably journaled in said non-metallic housings, the shaft extension mounted in said first housing having an axial bore therethrough and communicating with a bore through said spool, a contact secured to the end of said bored shaft extension in insulated relation thereto, a contact slidably mounted in said first housing in spring urged contact with the insulated contact, the other of said shaft extensions having a contact on the end thereof, a second slidably mounted contact in said second housing in spring urged contact with the contact on said other shaft extension, means in said housings for varying the spring pressure, means for connecting said slidably mounted contacts to a power source, means for attaching conductors on said spool to the spool carried contacts, and means for rotating said spool.

ARLEY G. BOYCE.

References Cited in the file of this patent

UNITED STATES PATENTS

| Number | Name | Date |
|---|---|---|
| 726,020 | Bryan | Apr. 21, 1903 |
| 752,696 | Masterson | Feb. 23, 1904 |
| 846,778 | Christman | Mar. 12, 1907 |
| 1,069,811 | Robinson | Aug. 12, 1913 |
| 1,190,872 | Dildine | July 11, 1916 |
| 1,277,582 | Heim | Sept. 3, 1918 |
| 1,599,124 | Fisler | Sept. 7, 1926 |
| 1,617,344 | O'Neil | Feb. 15, 1927 |
| 1,850,296 | Vermeulen | Mar. 22, 1932 |
| 1,906,791 | Grossmann | May 2, 1933 |
| 1,989,021 | Pedersen | Jan. 22, 1935 |
| 2,165,916 | Bissell | July 11, 1939 |